United States Patent
Iljas

(10) Patent No.: US 7,296,539 B2
(45) Date of Patent: Nov. 20, 2007

(54) SPILL RESISTANT WATER AND FOOD DISH FOR PETS

(76) Inventor: Sandra Eloise Iljas, 444 Hinsdale Ct., Worthington, OH (US) 43085

( * ) Notice: Subject to any disclaimer, the term of this patent is extended or adjusted under 35 U.S.C. 154(b) by 6 days.

(21) Appl. No.: 11/406,624

(22) Filed: Apr. 19, 2006

(65) Prior Publication Data

US 2007/0245968 A1    Oct. 25, 2007

(51) Int. Cl.
    *A01K 1/10*    (2006.01)
(52) U.S. Cl. ............... 119/61.54; 119/61.5; 119/61.55; 119/61.57; 119/454
(58) Field of Classification Search ............... 119/61.5, 119/61.54, 61.55, 61.56, 61.57, 454, 464, 119/475
See application file for complete search history.

(56) References Cited

U.S. PATENT DOCUMENTS

| | | | |
|---|---|---|---|
| 4,436,056 A * | 3/1984 | MacLeod ...................... 119/72 |
| 5,105,768 A * | 4/1992 | Johnson ................... 119/61.56 |
| 5,743,210 A | 4/1998 | Lampe |
| 5,787,839 A | 8/1998 | Magnant et al. |
| 5,823,136 A | 10/1998 | Zarski |
| 5,960,740 A * | 10/1999 | Pelsor ...................... 119/61.54 |
| 5,960,741 A | 10/1999 | Ballen et al. |
| 6,557,489 B2 | 5/2003 | King |
| 6,681,719 B1 | 1/2004 | Warner |
| 7,204,202 B2 * | 4/2007 | Behun et al. ............... 119/61.5 |

* cited by examiner

*Primary Examiner*—Peter M. Poon
*Assistant Examiner*—Willie Berry, Jr.
(74) *Attorney, Agent, or Firm*—Raymond M. Galasso; Galasso & Associates, LP.

(57) ABSTRACT

A spill resistant pet food and water dish is provided which incorporates features to prevent contents from spilling over the side of the dish when the dish is jarred or bumped during transport or while in use in feeding, the pet food and water dish being adaptable to a variety of sizes of animals, the dish incorporating a means of securely fastening the dish to the side of the pet carrier or crate, the dish providing one or more cavities within the base of the dish to receive ice packs or ice to chill the contents of the dish. The spill resistant pet dish may be used independently of a cage and placed on the floor or ground for pet feeding, particularly in a moving vehicle or boat, wherein the spill resistant features of the disclosed pet dish are advantageous to minimize or eliminate spillage of food or water from the dish.

6 Claims, 2 Drawing Sheets

SPILL RESISTANT WATER AND FOOD DISH FOR PETS

FIELD OF THE DISCLOSURE

The disclosures made herein relate generally to pet food and water dishes, and particularly to pet food and water dishes designed to provide food or water to pets when confined within and transported in a pet carrier or crate. The disclosures herein more particularly relate to pet food and water dishes which incorporate features to prevent contents from spilling over the side of the dish during transmit and which also provide a means of securely fastening the dish to the side of the pet carrier or crate.

BACKGROUND

Pet food and water dishes of various designs are known and are commonly used. Often pet owners or trainers choose to travel with their pet, sometimes perhaps to visit family, to travel to a distant destination for a vacation, or just perhaps to transport the animal from one location to another, perhaps even to a park or outdoor wooded location for exercise. Additionally, sometimes it may be necessary to transport a pet on public transportation. Pet owners transporting their pets using public transportation means such as planes, trains and busses usually have limited options in transporting their pet. In such cases laws and regulations may require pets to be placed into a pet carrier or some other type of cage, for health, safety and cleanliness reasons, as well as to allow transport of the pet in the luggage area of a plane or bus. Often such excursions with the family pet can take a considerable amount of time during which it is prudent and humane to provide to the animal within the cage a ready supply of drinking water and food in a pet dish. When transporting the pet in a cage, the cage can be subject to substantial jostling and bumping which can result in the spillage of food or water from the pet feeding dish resulting in soiling of the cage as well as the environment surrounding the cage. As pet owners know, typical pet dishes with their low sidewalls, broad flat bottoms and wide top openings easily spill their contents when bumped or tipped, and as such are unsuitable for use in pet carriers and cages. Additionally, typical pet dishes do not provide a means of securely mounting the dish to the cage wall and so are free to slide and move within the cage.

Therefore, a spill resistant water and food dish for pets that is designed for use within a pet carrier or cage, that provides a means of removably securing the dish to a side wall of a pet carrier or cage, that incorporates features to prevent the spillage of food and drinking water into the cage and surrounding environment, such a pet food or water dish design would be useful and novel.

SUMMARY OF THE DISCLOSURE

Accordingly, embodiments of the inventive disclosures made herein comprise various embodiments of a spill resistant food and water dish for pets, a dish design that is particularly suited for use with a pet carrier or cage. Pets may typically be cats or dogs, but this disclosure is not limited to use with cats and dogs and is applicable for use with a wide variety of and various sizes of animals.

A first and at least one embodiment of the inventive disclosures made herein comprises a cage mountable spill resistant feeding dish for a household pet animal comprising a feeding dish for holding food or water, the dish comprising: an elongated 'D' shaped dish base structure having one or more cavities therein designed to receive an ice pack or ice to keep the pet food or water chilled. The elongated 'D' shaped dish base structure forms a 'U' shaped exterior sidewall and a substantially flat rectangular back wall having one or more voids there-through into the ice pack cavity. The back wall is attached on opposite edges to opposing edges of the 'U' shaped sidewall. The 'D' shaped top surface of the dish base has a closed bottom depression for holding food or water therein, the depression having cylindrical side walls. A raised cylindrical ring is formed on the top surface of the dish structure, the ring having a cylindrical inside surface joining the cylindrical walls of the depression. The outside surface of the raised ring has a circumferentially threaded portion to receive and threadably engage a feeding dish cover. The back wall of the dish base is provided with a means for removably and supportively mounting the dish to a side wall of a cage or animal carrier. The feeding dish cover of the present invention is provided with features to reduce the opportunity for and chance of spillage of food and water from the dish. The feeding dish cover comprises a generally cylindrical sidewall having circumferential threads on a lower portion of an inside surface. The cover sidewall and threads are sized and fitted to threadably and removably engage the threaded section of the cylindrical ring of the dish base so as to provide a partial closure over the food or water in the dish. The cover having an 'O' shaped top wall further having an inner circumferential edge and an outer circumferential edge, the outer edge attached to the top edge of the cover sidewall. A truncated cone shaped surface having an outer circumferential edge and an inner circumferential edge defining a hole where the cone is truncated, the outer edge of the cone shaped surface secured to the inner surface of the cover sidewall, the inner circumferential edge of the cone sized and adapted to permit the animal to access food in the dish through the feeding hole in the center of the cone, the cone sloping downwardly from periphery edges towards the hole to encourage displaced food to drain back into the dish through the feeding hole.

The variations of the spill resistant dish, cover and access hole can be made in any size to suit the physical head, mouth dimensional requirements of any particular animal. In particular, the feeding hole in the cover cone must be sufficient to allow the animal to reach food or water within the bowl, but not so large as to permit the contents of the bowl to splash out. Additionally a rubber 'O' ring or gasket seal is provided between the cover and the threaded ring of the dish base to provide a leak-proof seal between the cover and the dish.

In another embodiment of the inventive disclosures made herein, the cage mountable spill resistant food feeding dish for a household pet animal comprises a feeding dish for holding food or water, the dish comprising: a generally cylindrical side wall; a threaded section on an upper portion of an outside surface of the side wall; a bottom wall peripherally secured to a bottom edge of said sidewall, said bottom wall together with the sidewall forming a closed bottom dish. A feeding dish cover comprises a generally cylindrical sidewall, the cover sidewall having circumferential threads on a lower portion of an inside surface, the cover sidewall and threads sized and fitted to threadably and removably engage the threaded section of the feeding dish sidewall. The feeding dish cover having an 'O' shaped top wall having an inner circumferential edge and an outer circumferential edge, the outer edge attached to a top edge of the cover sidewall. The feeding dish cover further comprising a truncated cone shaped surface having an outer circumferential edge and an inner circumferential edge defining a hole where the cone is truncated, the outer edge of the cone shaped surface secured to the inner surface of the cover sidewall, the inner circumferential edge of the cone sized and adapted to permit the animal to access food in the dish through the feeding hole in the cone, the cone sloping downwardly towards the hole to encourage displaced food to drain back into the dish through the hole. Additionally, a dish holder is provided that is adapted for removably mounting to an interior side wall of an animal travel cage, the dish holder comprising: a top surface having a general 'D' shape with a cylindrical depression therein, the depression sized and adapted to supportively and retentively receive the separate removable feeding dish, the elongated 'D' shape forming a 'U' shaped sidewall and together with a substantially flat rectangular back wall, the back wall having a threaded hole and one or more voids through the back wall into the ice pack cavity, the voids to receive ice packs to maintain dish contents chilled for an extended time. Also provided is a means of removably and supportively mounting dish holder back wall to the side wall of the cage. A rubber 'O' ring or gasket seal is provided between the cover and the threaded ring of the dish base to provide a leak-proof seal between the cover and the dish. As in the first embodiment, the dimensions of the spill resistant dish, cover and access hole can be made in any size to suit the size of the animal.

In at least one of the embodiments of the spill resistant pet dish in accordance with the inventive disclosure herein, the means of mounting the dish holder back wall to the side wall of the cage utilizes a threaded hole through the back wall of the dish holder; and a threaded screw with a flat head having ridges to allow finger tightening of the screw, the screw sized and configured to threadably, retentively and removably engage the threaded hole in the back wall. To secure the dish holder base to the cage or pet carrier wall, the screw is inserted through the sidewall of the cage and then received into the threaded hole on the back wall of the dish holder. The screw is then finger tightened to removably secure the dish holder in place on the sidewall of the cage or pet carrier. The invention is not limited to this example means of securing the pet dish to a cage wall. Other means of removably mounting the spill resistant pet dish to a pet carrier or cage wall, as would be know to one skilled in the art, may be utilized without deviating from the intention of this disclosure.

Various embodiments of the spill resistant dish may be realized by use of molded hard plastic or the use of particularly suitable metallic materials such as stainless steel.

Use of the spill resistant pet dish is not confined to use with a pet cage or carrier. Embodiments of the spill resistant pet dish may be used on the floor alone, without a cage or pet carrier, for example while traveling. The flat bottom of the spill resistant dish together with the spill resistance features discussed above provide a pet food and water dish that can be advantageously utilized by placing on the floor or ground to provide food or water to a pet, for example, on the floor of a moving vehicle such as a camper, boat or van.

In at least one embodiment of the inventive disclosures made herein, components of the spill resistant dish comprises a plastic having added photoluminescent pre-coloured compounds of the type utilized for direct injection molding into the plastic. The resulting photoluminescent or glow in the dark plastic enables the spill resistant dish to be readily located in the dark. Photolumiscent phosphors are available in various grades, high grades proving illumination in the dark for up to 12 hours.

It is an objective of the inventive disclosure made herein to provide a pet dish which is designed for removably mounting to the interior of a pet carrier or cage.

It is another objective of the inventive disclosure made herein to provide a pet dish which is designed to minimize or eliminate spillage of food or water from the dish, and thereby reduce soiling of the case and surrounding environment from pet feeding dish spills.

It is another objective of the inventive disclosure made herein to provide a pet dish which provides a cavity in the base of the dish into which ice packs or ice can be placed to maintain pet food or water in a chilled condition.

It is another objective of the inventive disclosure made herein to provide a pet dish which can be removed from the cage or carrier and used independently and placed on the floor or ground for pet feeding, particularly in a moving vehicle or boat wherein the spill resistant features of the disclosed pet dish are advantageous to minimize or eliminate spillage of food or water from the dish.

The above discussed objects and other objects of the invention made herein are intended to be illustrative of the invention and are not meant in a limiting sense. Many possible embodiments of the invention may be made from the inventive disclosures herein and will be readily evident upon study of the specification and accompanying drawings. Various features and sub combinations of invention may be employed without reference to other features and sub combinations. Other objects and advantages of this invention will become apparent from the provided descriptions taken in connection with the accompanying drawings, wherein is set forth by way of illustration and example, an embodiment of this inventive disclosure.

BRIEF DESCRIPTION OF THE DRAWINGS

The drawings show a form of the invention that is presently preferred; however, the invention is not limited to the precise arrangement shown in the drawings.

DETAILED DESCRIPTION OF THE DRAWINGS

Figure 1:
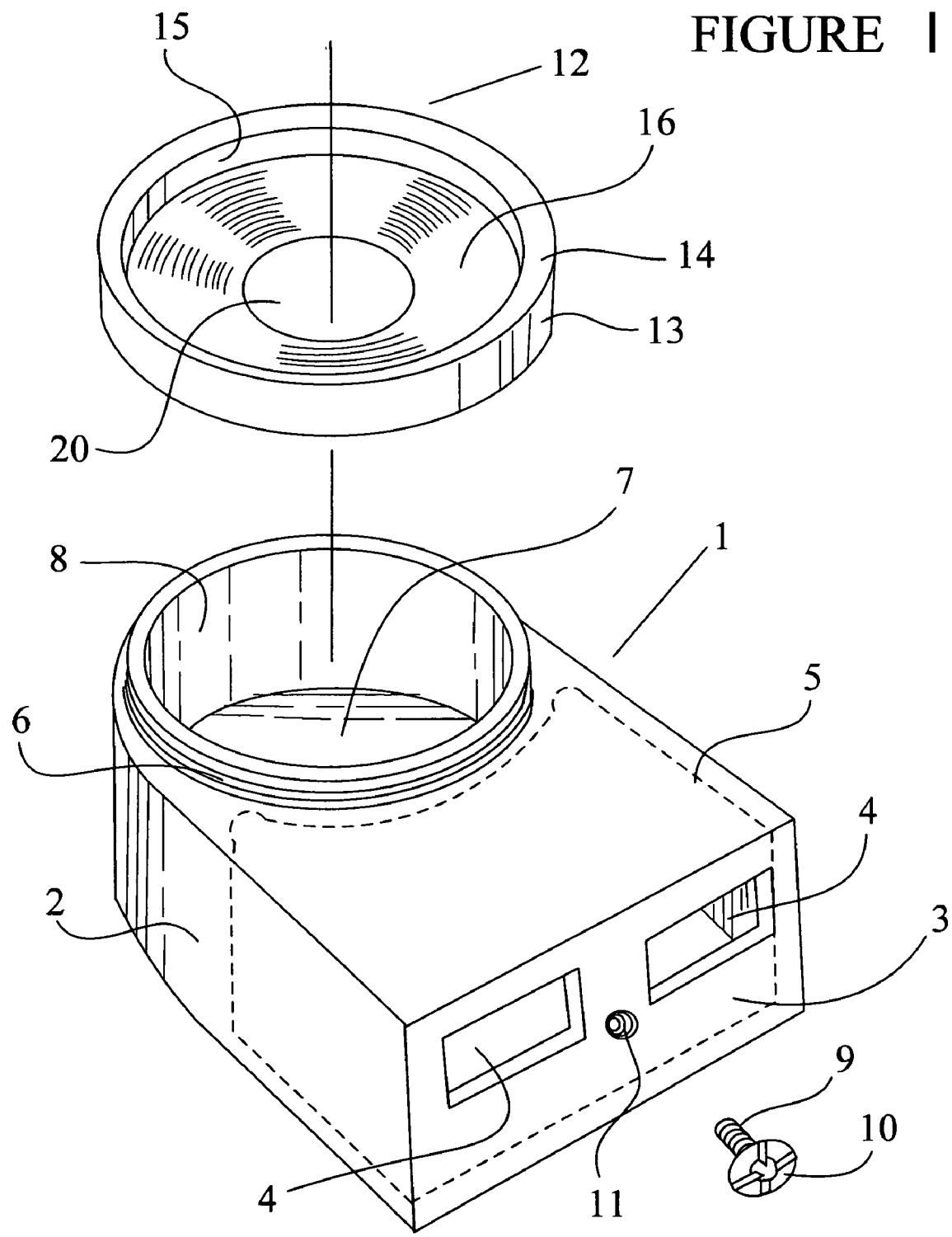
FIG. 1 depicts a perspective view of one embodiment of the spill resistant pet dish in accordance with the inventive disclosures herein.

In preparation for explaining the details of the present inventive disclosure, it is to be understood by the reader that the invention is not limited to the presented details of the construction, materials and embodiments as illustrated in the accompanying drawings, as the invention concepts are clearly capable of other embodiments and of being practiced and realized in various ways by applying the disclosure presented herein. Additionally, the drawings disclose one embodiment as a typical illustrative enabling example. Other embodiments and variations are discussed below and it is to be understood that the inventive disclosure is not limited to the embodiment displayed in the drawings, and is further not limited to the embodiments specifically discussed below, but is intended to be read as covering equivalents within the spirit and intent of descriptions and claims.

FIG. 1 depicts one particular embodiment of spill resistant water and food dish for pets in accordance with the inventive disclosures presented herein. In FIG. 1 the spill resistant water or food dish for pets 1 comprises a 'D' shaped base structure have a 'U' shaped sidewall 2. A substantially rectangular and substantially flat back wall 3 is attached at opposing ends to opposite ends of the 'U' shaped sidewall 2. The back wall is provided with one or more voids therethrough into the ice pack cavity 5. The ice pack cavity, generally outlined in FIG. 1 with a dotted line, is closed at the bottom with a bottom surface so as to provide a closed bottom container to hold ice packs or ice to keep the food or water chilled. The 'D' shaped base structure is closed out at the top with a 'D' shaped top surface 22 having a closed bottom depression 7 for holding food therein, the depression having cylindrical side walls 8. A raised cylindrical ring 6 is formed on the 'D' shaped top surface top of the dish base structure, the ring having a cylindrical inside surface joining the cylindrical walls 8 of the closed bottom depression 7. The outside surface of the raised ring 6 is provided with a circumferentially threaded portion to engage a cover.

The rectangular back wall 3 is provided with a means of removably and supportively mounting the spill resistant pet dish to an interior side wall of a pet carrier or cage. In FIG. 1 the means for removably and supportively mounting comprises a threaded screw 9 with a head having ridges 10 to allow finger tightening of the screw, the screw sized and configured to threadably, retentively and removably engage the threaded hole 11 in the back wall 3.

Continuing with FIG. 1, a feeding dish cover 12 comprises a generally cylindrical sidewall 13, the cover sidewall 13 having circumferential threads on a lower portion of an inside surface, the cover sidewall and threads sized and fitted to threadably and removably engage the threaded section of the cylindrical ring 6. 'O' shaped top wall 14 has an inner circumferential edge and an outer circumferential edge, the outer edge is attached to a top edge of the cover sidewall.

Still referring to FIG. 1, the cover is provided with a truncated cone shaped surface 16, the cone shaped surface providing a sloped surface to encourage food or water displaced from within the feeding dish to drain by gravity back into the dish. The truncated cone shaped surface 16 having an outer circumferential edge and an inner circumferential edge defining a feeding hole where the cone is truncated, the outer edge of the cone shaped surface secured to the inner surface of the cover sidewall, the inner circumferential edge of the cone defining a feeding access hole sized and adapted to permit the animal to access food in the dish through the hole in the cone. The cone slopes downwardly from the peripheral side edges of the cover towards the hole to encourage displaced food to drain back into the dish through the hole with the aid of gravity. The cone partially obstructs the top of the dish holding food or water, thereby further preventing the water or food from spilling out or otherwise unintentionally leaving the pet dish. More specific details about the spill prevention features of this inventive disclosure are provided further down below.

Figure 2:
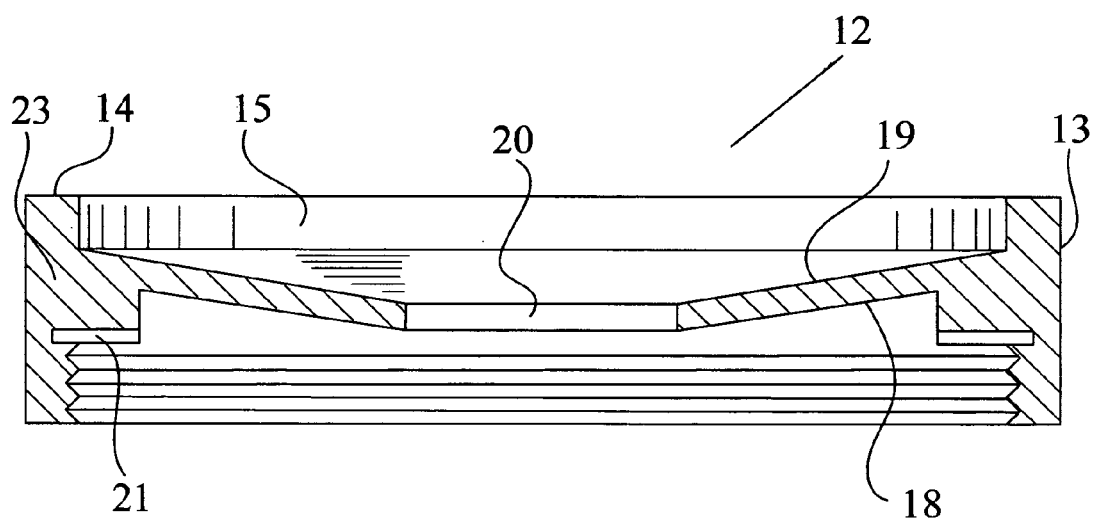
FIG. 2 depicts a cut-away sectional view of the feeding dish cover in accordance with the inventive disclosures herein.

Now referring to FIG. 2 and to the spill resistant features of the present inventive disclosure. FIG. 2 is sectional view of the feeding dish cover 12 in which one half of the cover has been cut away along an axis of symmetry through the center of the cover as an aid in illustration of other spill prevention features of the present embodiment. Feeding dish cover 12 comprises a cylindrical outside sidewall 13, an 'O' shaped cover top wall 14, a spill limiting inside sidewall 15, an inner cone shaped surface 18, and outer cone shaped surface 19, a rubber or pliable gasket 21 provides a water tight seal between the ledge 23 of the cover and the dish, and a feeding access hole 20. In use, food or water is present below the cover and features of the cover cooperate to prevent water and food from splashing out of the dish through the feeding hole when the dish is bumped or displaced. As discussed earlier, gasket 21 provides a water tight seal between the cover and the food or water in the pet dish. The region over the perimeter portions of the food dish are covered by the inner cone shaped surface 18. In the case of water in the dish, bumping or jarring the dish causes a wave-like feature in the water that would tend to splash or ride over the dish walls at the perimeter sidewall of the dish. With the feeding dish cover installed on the dish, the water tends to splash against the inner cone shaped surface 18 near the periphery side walls, and is deflected back into the bowl. Liquids or food that may become displaced from the bowl through the feeding access hole 20 tend to have low velocity if they manage to escape through the center region of the bowl. This low escape velocity in a region over the center of the dish can be illustrated with a thought experiment based on every day experiences. An experiment with a glass half full of water will demonstrate that when the glass is displaced horizontally a wave is created in the glass, the wave moving along the direction of displacement. This wave causes the water level on the side of the glass nearest the direction of the displacement to initially drop in level, and similarly the water level on the opposite side of the glass initially rises in level. More importantly, one can observe that the water at the center of the glass along a line perpendicular to the direction of displacement does not substantially rise or fall in level, meaning no to low displacement or velocity for water or food particles in that region. This low energy or low displacement region lies under the feeding hole in FIG. 2. By this arrangement food or water ejected from a horizontal bump or horizontal movement of the pet feeding dish will tend to have low velocity even if ejected at the center feeding hole. The outer cone shaped surface 19 and spill limiting inside cover sidewall 15 will tend to capture spills and return the material to the feeding dish with the aid of gravity, thereby reducing or elimination spillage.

In FIG. 1 the depicted embodiment the pet dish is formed integrally with the base. A variation of the FIG. 1 embodiment yields another embodiment of the present inventive disclosure. The FIG. 1 embodiment is modified to have a pet dish as a separate bowl that is removable from the base through the hole in the 'D' shaped top surface 22. The cover 12 is threadably engaged onto mating threads on the removable dish outside sidewall, permitting the dish with the cover to be removed from the base and used separately from the elongated 'D' shaped base structure 2. In this case the base structure serves only to support the dish and cover in a cage or carrier, and serves also as a holder for ice packs or ice to keep the contents of the dish chilled.

In the preceding detailed description, reference has been made to the accompanying drawings that form a part hereof, and in which are shown by way of illustration specific embodiments in which the invention may be practiced. These embodiments and certain variants thereof have been described in sufficient detail to enable those skilled in the art to practice the invention. It is to be understood that other suitable embodiments may be utilized and that logical, material, and mechanical changes may be made without departing from the spirit or scope of the invention. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A spill resistant feeding dish for a household pet animal comprising:
an elongated 'D' shaped dish base structure having one or more cavities to receive an ice pack, the elongated 'D' shape forming a 'U' shaped exterior sidewall, the dish base structure further comprising:
a substantially flat rectangular back wall having one or more voids there-through into the ice pack cavity, the back wall attached to opposing edges of the 'U' shaped sidewall;
a 'D' shaped top surface having a closed bottom depression for holding food therein, the depression having cylindrical side walls, the 'D' shaped top surface attached to top edges of the 'U' shaped sidewall and back wall;
a 'D' shaped bottom surface, the 'D' shaped bottom surface attached to bottom edges of the 'U' shaped sidewall and back wall; and
a raised cylindrical ring formed on the top surface of the 'D' shaped surface, the ring having a cylindrical inside surface joining the cylindrical walls of the depression, a substantially flat top sealing surface, an outside surface of the ring having a circumferentially threaded portion; and
a feeding dish cover comprising:
a generally cylindrical sidewall having an inside surface, the cover sidewall having circumferential threads on a lower portion of the cover inside surface, the cover sidewall and threads sized and fitted to threadably and removably engage the threaded section of the cylindrical ring;
a gasket secured to a ledge of the cover cylindrical sidewall above the threads of the cover sidewall, the gasket sized and adapted to sealably compress between the top sealing surface of the raised ring and the ledge of the cover to provide a water tight seal between the cover and the raised cylindrical ring of the feeding dish;
an 'O' shaped top wall having an inner circumferential edge and an outer circumferential edge, the outer edge attached to a top edge of the cover sidewall;
a cylindrical spill limiting sidewall attached at an upper edge to the inner circumferential edge of the 'O' shaped top wall; and
a truncated cone shaped surface having an outer circumferential edge and an inner circumferential edge defining a hole where the cone is truncated, the outer edge of the cone shaped surface is secured to the spill limiting sidewall, the inner circumferential edge of the cone sized and adapted to permit the animal to access contents of the dish through the hole in the cone, the cone sloping downwardly towards the hole to encourage displaced food to drain back into the dish through the hole, the cone cooperating with the spill limiting sidewall to minimize spillage of food or water from the dish.

2. The spill resistant feeding dish for a household pet animal of claim 1, wherein the elongated 'D' shaped dish base structure further comprises a means of removably and supportively mounting the back wall to a side wall of a cage.

3. The spill resistant food feeding dish for a household pet animal of claim 2, wherein the means of mounting the dish holder back wall to the side wall of the cage comprises:
a threaded hole through the back wall; and
a threaded screw with a flat head having ridges to allow finger tightening of the screw, the screw sized and configured to threadably, retentively and removably engage the threaded hole in the back wall, the screw removably securing the dish holder to side wall of the cage.

4. A cage mountable spill resistant food feeding dish for a household pet animal comprising:
a removable feeding dish for holding food or water, the dish comprising:
a generally cylindrical side wall having an inside surface, and outside surface and an 'O' shaped top surface attached to and spanning between upper edges of the inside and outside surfaces;
a threaded section on an upper portion of the outside surface of the side wall; and
a bottom wall peripherally secured to a bottom edge of said sidewall, said bottom wall together with the sidewall forming a closed bottom dish;
a feeding dish cover comprising:
a generally cylindrical sidewall having an inside surface, the cover sidewall having circumferential threads on a lower portion of the inside surface, the cover sidewall and threads sized and fitted to threadably, removably engage the threaded section of the feeding dish sidewall;
an 'O' shaped top wall having an inner circumferential edge and an outer circumferential edge, the outer edge attached to a top edge of the cover sidewall outer surface;
a cylindrical spill limiting sidewall attached at an upper edge to the inner circumferential edge of the 'O' shaped top wall;
a gasket secured to a ledge of the cover cylindrical sidewall above the threads of the cover sidewall, the gasket sized and adapted to sealably compress between the top surface of the dish and the ledge of the cover to provide a water tight seal; and
a truncated cone shaped surface having an outer circumferential edge and an inner circumferential edge defining a hole where the cone is truncated, the outer edge of the cone shaped surface secured to the inner surface of the cover sidewall, the inner circumferential edge of the cone sized and adapted to permit the animal to access food in the dish through the hole in the cone, the cone sloping downwardly towards the hole to encourage displaced food to drain back into the dish through the hole, the cone cooperating with the spill limiting sidewall to minimize spillage of food or water from the dish; and
an elongated 'D' shaped dish holder having one or more cavities to receive an ice pack, the dish holder adapted for removably mounting to an interior side wall of an animal travel cage, the dish holder comprising:
a top surface having a general 'D' shape having a hole therein, the hole sized and adapted to supportively and retentively receive the removable feeding dish, the elongated 'D' shape forming a 'U' shaped sidewall and a substantially flat rectangular back wall, the back wall having one or more voids through the back wall into the ice pack cavity, the voids to receive ice packs to maintain dish contents chilled.

5. The spill resistant feeding dish for a household pet animal of claim 4, wherein the elongated 'D' shaped dish holder further comprises a means of removably and supportively mounting dish holder back wall to the side wall of the cage.

6. The spill resistant food feeding dish for a household pet animal of claim 5, wherein the means of mounting the dish holder back wall to the side wall of the cage comprises:
   a threaded hole through the back wall; and
   a threaded screw with a flat head having ridges to allow finger tightening of the screw, the screw sized and configured to threadably, retentively and removably engage the threaded hole in the back wall, the screw removably securing the dish holder to side wall of the cage.

* * * * *